July 3, 1923.
G. PIERETTI
SORTING TABLE
Filed Nov. 21, 1921     4 Sheets-Sheet 1
1,460,862
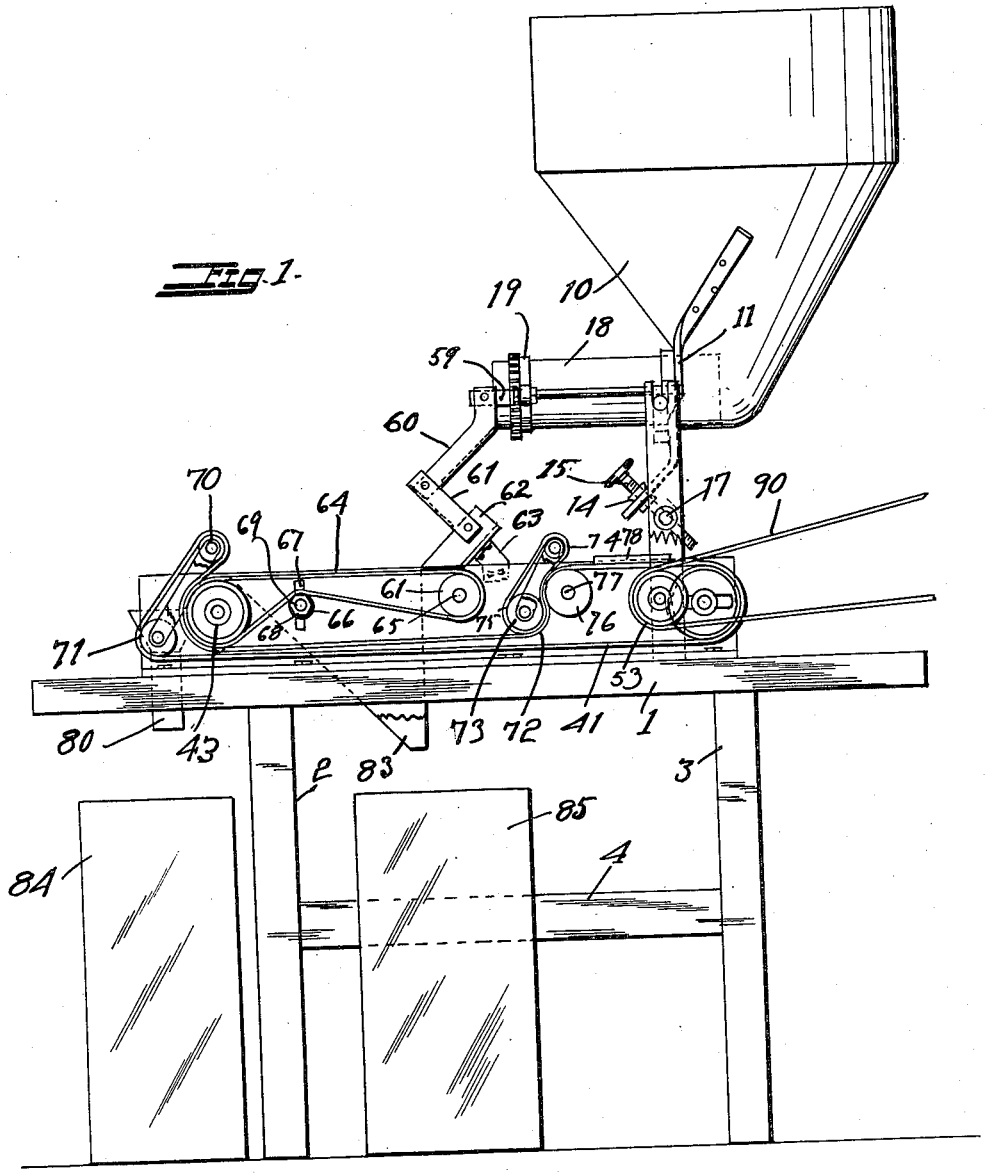
INVENTOR.
Giorgio Pieretti.
BY
Carlos P. Griffin
ATTORNEY.

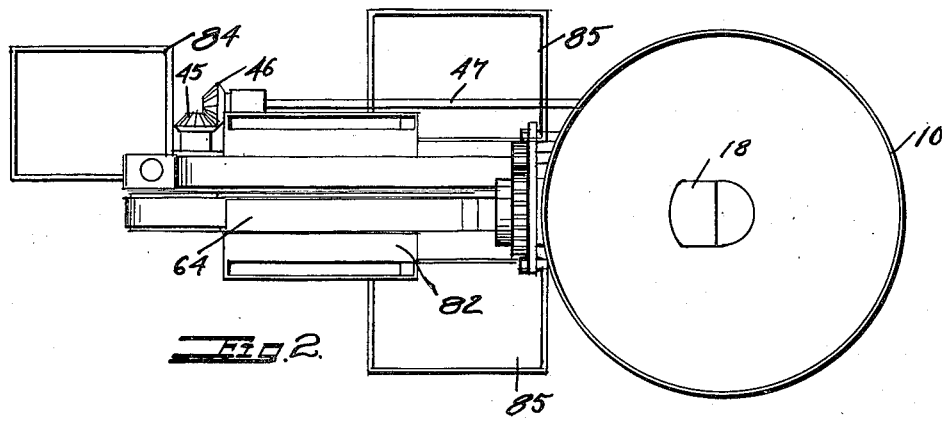
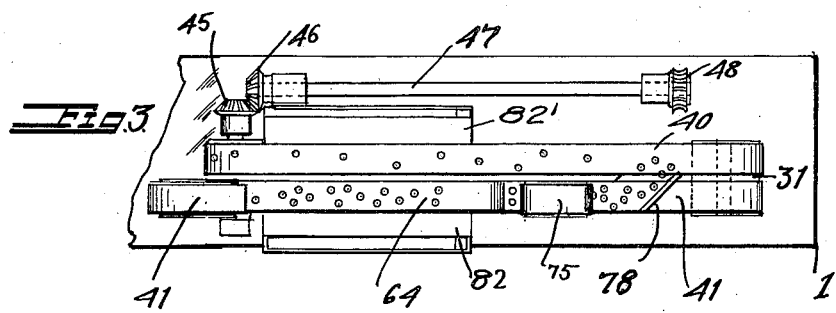
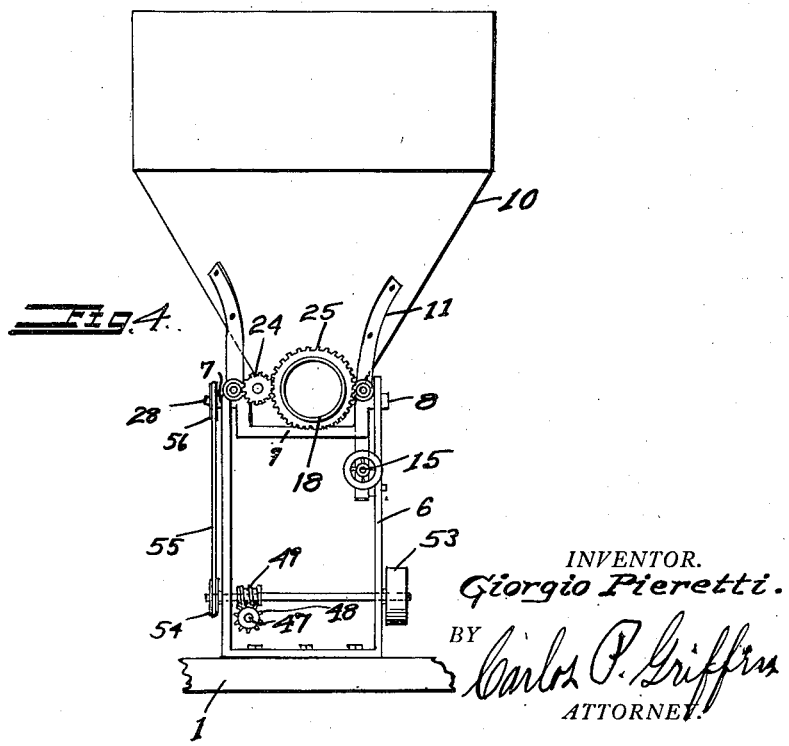

July 3, 1923.
G. PIERETTI
SORTING TABLE
Filed Nov. 21, 1921
1,460,862
4 Sheets-Sheet 3
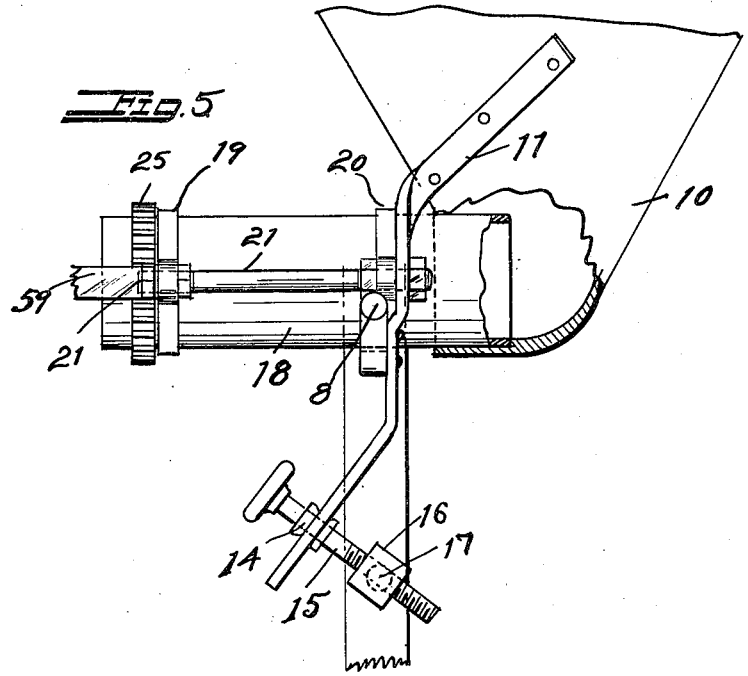
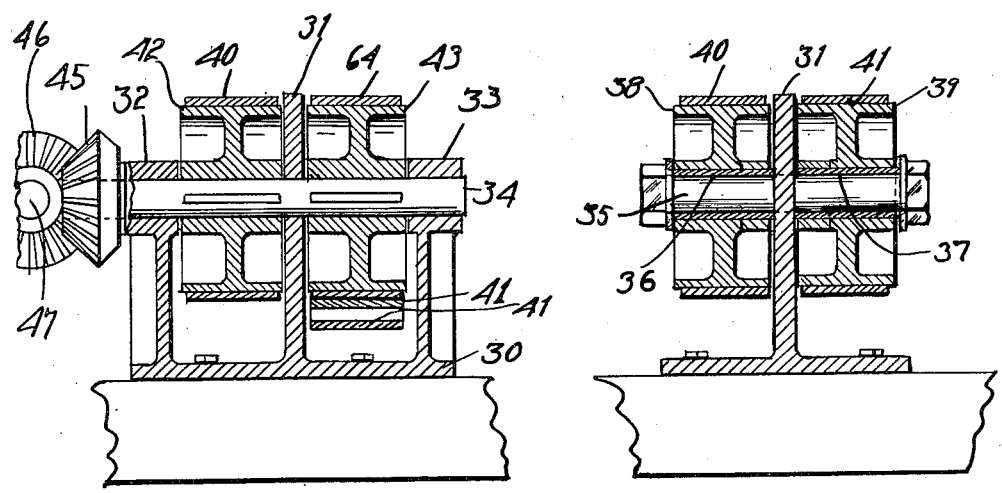
INVENTOR.
Giorgio Pieretti.
BY
Carlos P. Griffin
ATTORNEY.

July 3, 1923.
G. PIERETTI
SORTING TABLE
Filed Nov. 21, 1921
1,460,862
4 Sheets-Sheet 4
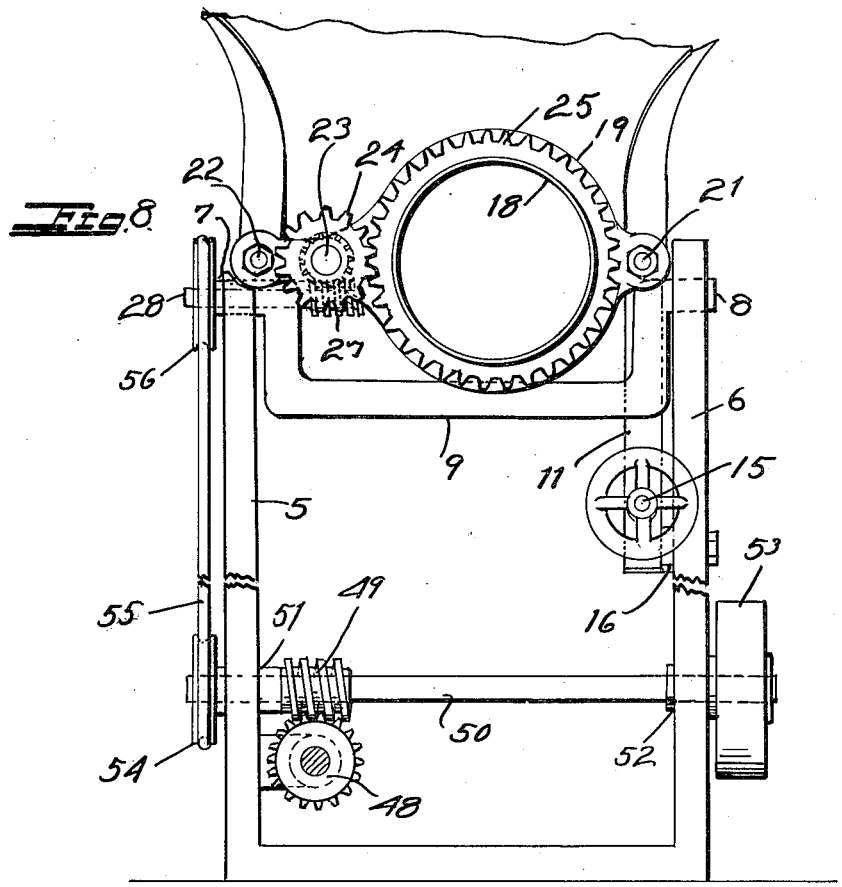
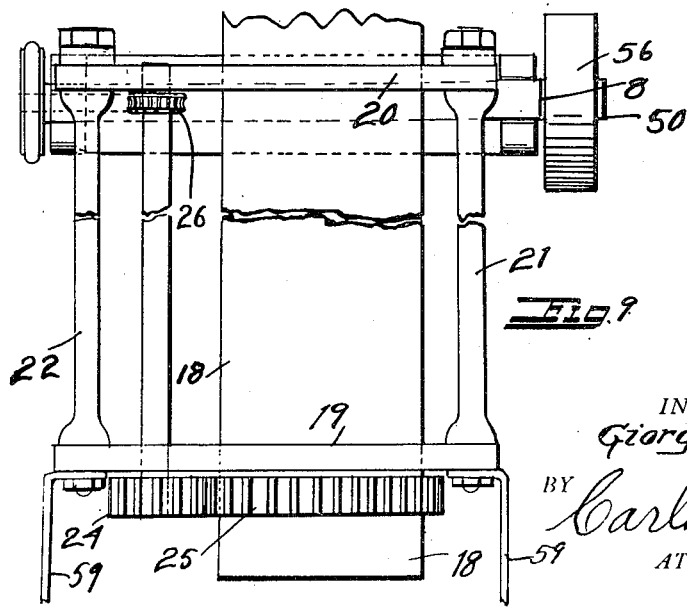
INVENTOR.
Giorgio Pieretti.
BY Carlos P. Griffin
ATTORNEY.

Patented July 3, 1923.

1,460,862

UNITED STATES PATENT OFFICE.

GIORGIO PIERETTI, OF SAN FRANCISCO, CALIFORNIA.

SORTING TABLE.

Application filed November 21, 1921. Serial No. 516,569.

*To all whom it may concern:*

Be it known that I, GIORGIO PIERETTI, a citizen of Italy, having taken out my first papers in the United States, residing at San Francisco, in the county of San Francisco, State of California, have invented a new and useful Sorting Table, of which the following is a specification in such full and clear terms as will enable those skilled in the art to construct and use the same.

This invention relates to a machine for sorting articles, and its object is to provide a machine which will enable the articles to be sorted to be distributed upon a sorting belt and having been sorted to be reversed in position and brought again under the vision of the sorter to be there finally sorted and thereafter delivered to a suitable place of storage.

It will be understood by those skilled in the art that in the manufacture of buttons and other flat articles of that character, it is necessary to examine the condition and color of the object on both sides, so that ordinarily it is necessary to either pick up the article and examine both sides of it, or to put it through a machine which will pass first one side and then the other into view of an inspector who can thereupon make the necessary examination of the article, and if necessary throw it out from the articles of standard quality.

A further object of the invention is to deliver the articles to the inspector so that they will always pass to the inspector in the same direction for the first and for the second inspection, thereby making it more convenient to make the inspection than it would be if the objects were delivered to the inspector traveling in one direction for the first inspection, and traveling in the opposite direction for the second inspection.

Another object of the invention is to provide a feeder which will automatically deliver to the operator as many of the objects as may be necessary to keep the operator busy, means also being provided to change the speed of feed with an adjusting screw within easy reach of the operator.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of the complete machine.

Fig. 2 is a plan view of the complete machine.

Fig. 3 is a plan view of the belts on a slightly larger scale than Figure 2.

Fig. 4 is a view in elevation of the feed cylinder, the supports therefor and the feed hopper.

Fig. 5 is a view in side elevation and partly in section of the feed hopper showing the means for adjusting the same.

Fig. 6 is a sectional view of the belt drive.

Fig. 7 is a sectional view of the loose pulleys at the opposite end of the belt from the pulleys shown in Figure 6.

Fig. 8 is a view in elevation of the feed end of the hopper on a slightly larger scale than Figure 4, and Fig. 9 is a plan view of the feeder on a slightly larger scale than the previous figures.

The machine is mounted upon a table 1 supported by suitable legs 2 and 3, said legs being braced by means of the cross bar 4.

At one end of the table there is a U-shaped frame having the standards 5 and 6, at the upper ends of which are the trunnions 7 and 8 for the support of the feed hopper and feed cylinder. A yoke 9 connects the two trunnions 7 and 8 and extends under the feed hopper 10. A long bar 11 is connected to the feed hopper and extends down between the two standards 5 and 6, and is provided with a nut 14 through which the adjusting screw 15 passes.

The adjusting screw 15 also passes through a nut 16 pivotally mounted at 17, whereby it is possible to tilt the hopper 10 and feed cylinder 18 to increase or diminish the amount of the feed. The feed cylinder is open at both ends and one end projects into the bottom of the feed hopper 10. As the feed cylinder and feed hopper are pivoted on the pins 7 and 8, the inclination of both of them is adjusted by the screw 15, thereby determining the rate of feed.

The feed cylinder is supported by and rotates in two circular yokes 19 and 20 which are connected together by means of two stay rods 21 and 22, the ends of which pass through the vertical portion of the yoke 9.

The yokes 19 and 20 also provide a journal bearing for a shaft 23, said shaft having a gear 24 at one end in mesh with a ring gear 25 extending around the tubular feeder 18 and having a worm wheel 26 at the other end in mesh with a worm 27 on a shaft 28 journaled in the trunnion 7.

Extending down the length of the table is a base 30 with a central web 31 provided at one end with journal bearings 32, 33 for a shaft 34. At the other end of the web 31 there is a fixed shaft 35 on which are two tubular spacers 36, 37, said spacers carrying two wheels 38, 39 around which two belts 40, 41 pass. These belts 40, 41 also pass around two wheels 42, 43 keyed to the shaft 34, and said shaft is rotated by means of the bevel gear 45 in mesh with the bevel gear 46 on the shaft 47, which shaft carries a worm wheel 48 in mesh with the worm 49 on the drive shaft 50.

The drive shaft is journaled in the standards 5 and 6 at 51 and 52 and has the drive pulley 53 thereon, and a pulley 54 around which the belt 55 passes to drive the pulley 56 on the shaft 28.

It will be observed that the yoke 19 has two forwardly projecting arms 59 which support the feed chute 60 from which another feed chute 61 is pivotally supported, and the latter feed chute is in turn pivotally connected with a feed chute 62 supported by an arm 63 in such a position that it will deliver objects fed thereto to the belt 64.

The belt 64 passes around a pulley 65 on a stud shaft projecting from one side of the web 31 and it passes over a pulley 66 which can be fixed in different adjustments in the slot 67, a nut 68 on the shaft 69 enabling this shaft to be placed in any suitable adjustment to hold the belt 64 tight.

The belt 41 also passes around the pulley 43 outside the belt 64 and around the pulleys 70, 71 which hold the belt 41 in contact with the pulley 43 for a sufficient distance to engage the buttons passing along the belt 64 before they have a chance to fall off said belt by gravity.

At the back of the belt 64 there is an arm 72 which supports two pulleys 73, 74 around which a short belt 75 passes. This belt also engages the belt 41 for a portion of its travel, and said belt 41 at this point also passes around a pulley 76 on a stud shaft 77 secured to the center supporting web 31.

Immediately under the mechanism for adjusting the inclination of the feed tube 18 there is a switch 78 which is secured to the center web 31 in any desired manner, and which switch rests upon the top of the belt 41. All of the belts 40, 41 and 64 run as close to the center web 31 as possible in order to avoid having any space into which the objects to be sorted could drop.

At the front of the machine there is a chute 80 into which the select articles are dropped from the belt 40, while at the sides of the belt 40 and belt 64 there are chutes 82', 82 leading to the chute 83 into which the operator pushes the unsuitable articles. Suitable receptacles 84, 85 may be used to collect good and rejected articles.

Power is applied to the apparatus through the medium of the pulley 53 and belt 90, and in operation the belts 40 and 64 are arranged to travel in the same direction at substantially the same speed, so that as the articles are delivered from the chute 63 to the belt 64 they will pass under the eye of the inspector with one side up. At this point the inspector will push off all of the undesirable articles; whereupon they will pass between the two belts 64 and 41 and finally be delivered by the belt 41 to the belt 75 which latter belt will cause the objects to be elevated with the bottom side up to the level of the higher portion of the belt 64 when the belt 75 passes under the switch 78. At this point the objects will be pushed over on to the belt 40 and will again pass the inspector traveling in the same direction as the buttons or other objects on the belt 64 but with the bottom side up. As they pass the inspector this second time, undersirable objects will be pushed off into the chute 82. The operator will increase or diminish the feed by changing the position of the feed hopper and feed tube 18 by changing the position of the feed screw 15.

What I claim is as follows, but various modifications may be made in the construction shown in the drawings and above particularly described form, within the purview of my invention.

1. A sorting table of the character described, comprising a pair of traveling belts running side by side, means to deliver objects to one of said belts, means to reverse the position of the said objects and to deliver them to the other belt whereby both sides of a series of objects may be inspected at one place by the operator.

2. A sorting table of the character described, comprising a feed hopper, a belt upon which the objects to be sorted are received from the feed hopper, a second belt traveling by the side of the first belt, a third belt for reversing the position of the objects placed upon the first belt and a switch to transfer the objects from the latter belt to the second belt for inspection by the operator at one position.

3. A sorting table of the character described, comprising a feed hopper, a pair of belts to one of which objects from the feed hopper are delivered, a third belt extending below the first belt and in contact therewith to reverse the position of the objects, means to cause the third belt to raise the objects to the level of the first belt and a switch for transferring the objects from the third belt to the second belt whereby the objects may be inspected upon both sides at one position by the operator.

In testimony whereof I have hereunto set my hand this 9th day of November A. D. 1921.

G. PIERETTI.